June 16, 1931.                J. L. HOGG                1,810,016
                       VOICE OPERATED RELAY CIRCUITS
                            Filed June 6, 1929

Fig. 1-A

INVENTOR
J. L. HOGG
BY
J. A. Burgess
ATTORNEY

Patented June 16, 1931

1,810,016

UNITED STATES PATENT OFFICE

JOHN L. HOGG, OF EAST ORANGE, NEW JERSEY, ASSIGNOR TO BELL TELEPHONE LABORATORIES, INCORPORATED, OF NEW YORK, N. Y., A CORPORATION OF NEW YORK

VOICE OPERATED RELAY CIRCUITS

Application filed June 6, 1929. Serial No. 368,955.

This invention relates to accelerating and delay action devices and more particularly to relay arrangements suitable for controlling signal operated devices in signaling systems such, for example, as voice operated control circuits.

The main object of the invention is to provide a circuit arrangement which will operate and hold for a sufficient time after it operates to insure proper operation of the circuit with which it is to be employed.

One of the features of this invention consists in the method employed to secure rapid operation without contact chatter and to secure a so-called "hangover" time in the case of signal operated volume control circuits.

The incoming signal waves are rectified and these rectified currents are transmitted through the windings of a main and auxiliary relay. When the amplitude of the incoming impulses is sufficient to break the normally closed contacts of the main and auxiliary relays a battery charges a condenser through other windings of each of the relays, thereby assisting the armatures toward their operated positions and causing both relays to fully operate. At the same time a second condenser charges causing the grid of a three-element vacuum tube to become more positive. The output of the vacuum tube is transmitted through another winding on the main relay which causes the armature of the main relay to hold in its operated position. After the current from the rectifier approaches zero amplitude and the first condenser has fully charged, the armature of the auxiliary relay releases and returns to its normal position. This discharges the second condenser through high resistances, maintaining the main relay operated for a definite period of time while the second condenser is discharging.

Figure 1:
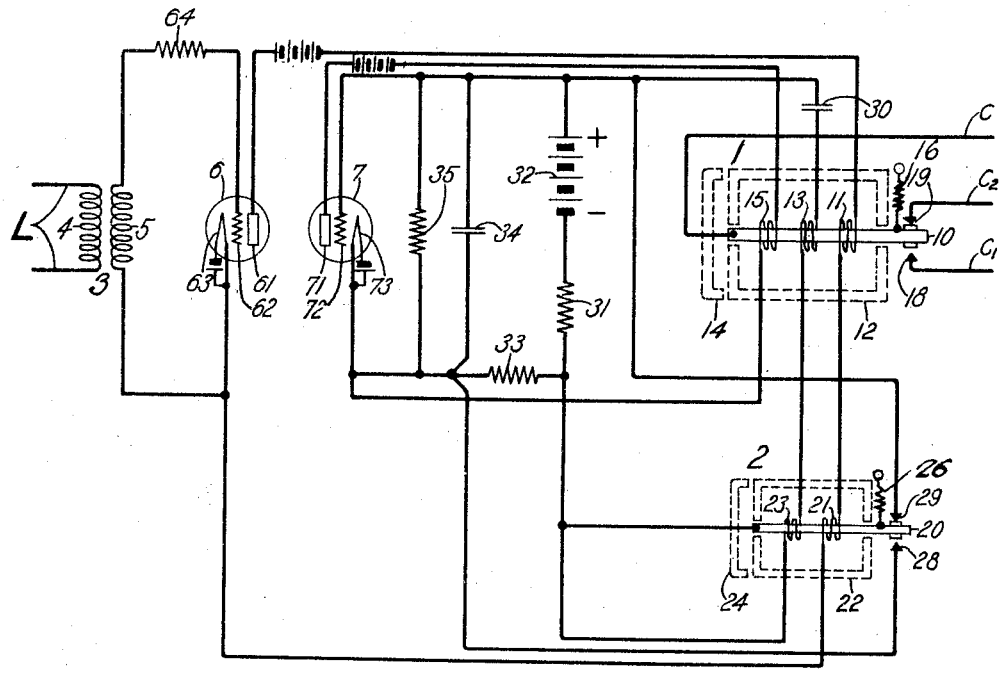
Figure 1:
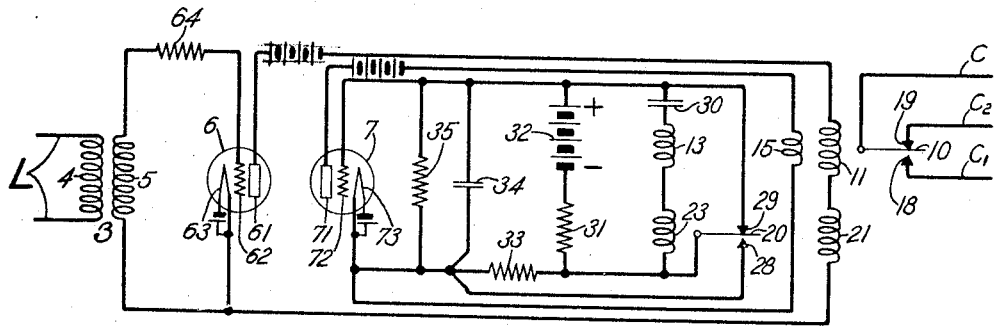

The invention will be better understood by referring to the following detailed description and accompanying drawings, wherein Fig. 1 illustrates the preferred embodiment of the invention and Fig. 1—A illustrates the same embodiment showing the relays in schematic form to facilitate following the description of the operation of the invention.

The relays 1 and 2, which are preferably polar relays, and the equipment associated therewith are utilized to operate switches, which complete an electrical path from conductor C to conductor $C_1$ and open the circuit through the normally closed electrical path from conductor C to conductor $C_2$, in response to signal impulses received over the line L.

The relay 1 has a yoke 12 and a permanent magnet 14 associated with said yoke. The relay 1 has windings 11, 13 and 15, and an armature 10, which armature is arranged to swing between contacts 18 and 19. The armature 10 is biased by means of a spring 16 so that it is normally in connection with the contact 19.

The relay 2 has a yoke 22 and a permanent magnet 24 associated with said yoke. The relay 2 has windings 21 and 23 and an armature 20 which is arranged to swing between contacts 28 and 29. The armature 20 is biased by means of a spring 26 so that it is normally in connection with contact 29.

The primary winding 4 of a transformer 3 is bridged across the line L. One end of the secondary winding 5 of transformer 3 is connected through a resistance 64 to the grid 62 of vacuum tube 6, and the other side of this secondary winding 5 is connected to the filament 63 of vacuum tube 6. Plate 61 of vacuum tube 6 is connected through winding 11 on relay 1 and winding 21 on relay 2 in series to the filament 63 of vacuum tube 6. A condenser 30 is connected in series with winding 13 of relay 1 and winding 23 of relay 2. A battery 32 and a resistance 31 are connected in series with each other and in shunt with the series connection of the condenser 30 and the windings 13 and 23, from the condenser 30 to the winding 23. The grid 72 of vacuum tube 7 is connected to the junction of the positive terminal of battery 32 and condenser 30. The resistance 33 is connected between the filament 73 of vacuum tube 7 and the junction of resistance 31 and relay winding 23. A resistance 35 and a condenser 34 are connected in parallel from the grid 72 to the filament 73 of vacuum tube 7. Winding 15 on relay 1 is connected from the plate 71 to filament 73 of vacuum tube 7. The armature 20 on relay 2, which is normally in connection with contact 29, is arranged to normally short-circuit the series connection of the condenser 30, winding 13 on relay 1 and winding 23 on relay 2. The armature 20 is also arranged to make connection with contact 28 and thereby short-circuit the resistance 33 when the armature 20 is in its operated position.

The operation of the system is as follows: The incoming signals received over the line L are transmitted through the transformer 3 to the vacuum tube rectifier 6. The rectified currents are transmitted from the filament 63 of vacuum tube rectifier 6, through winding 21 on relay 2 and winding 11 on relay 1 to the plate 61 of vacuum tube 6. These rectified currents cause the armatures 10 and 20 of relays 1 and 2, respectively, to move from their normal position shown, thereby disconnecting the armature 10 from the contact 19 on relay 1 and disconnecting the armature 20 from the contact 29 on relay 2.

When the armature 20 is disconnected from contact 29 the condenser 30 charges up through the circuit from battery 32, condenser 30, winding 13 on relay 1, winding 23 on relay 2, resistance 31 to battery 32. The charging current which flows through winding 13 on relay 1 and winding 23 on relay 2 assists the rectified current from the output of vacuum tube rectifier 6 in moving the armatures 10 and 20 toward their operated positions, thereby completely operating these relays 1 and 2.

At the same time, the condenser 34 is charged through the circuit from battery 32, resistance 31, resistance 33, condenser 34 to battery 32. The resistance 33 causes condenser 34 to charge more slowly than condenser 30. As condenser 34 charges the grid 72 of vacuum tube 7 becomes more positive with respect to the filament 73.

As soon as the armature 20 on relay 2 reaches contact 28 the resistance 33 is short-circuited which causes condenser 34 to charge more rapidly and increases the positive potential of the grid 72 of vacuum tube 7. As the grid 72 becomes more positive, the space current from the filament 73 through winding 15 on relay 1 to the plate 71 of vacuum tube 7 increases, thereby causing the armature 10 on relay 1 to hold in its operated position after the cessation of signal impulses from the line L.

After the signal currents from the line L have approached zero amplitude and the condenser 30 has fully charged, the armature 20 on relay 2 is released and returns to its normal position shown. As soon as armature 20 disconnects from contact 28, condenser 34 begins to discharge through resistance 35. As soon as armature 20 meets contact 29, the condenser 34 discharges through the circuit from condenser 34, resistance 33, armature 20, contact 29 to condenser 34 in addition to the circuit through resistance 35. As resistances 33 and 35 are preferably large, the space current from vacuum tube 7 which flows through winding 15 on relay 1 is maintained sufficiently large to hold the armature 10 of relay 1 in an operated position for a definite period of time while the condenser 34 is discharging.

The connection of armature 20 with contact 29 also causes the condenser 30 to discharge through the circuit from condenser 30, winding 13 on relay 1, winding 23 on relay 2, armature 20 and contact 29 to condenser 30. This condenser discharge current tends to hold the armature 20 on relay 2 in its normal position without contact chattering taking place between the armature 20 and the contact 29. This condenser discharge current also tends to cause the armature 10 of relay 1 to leave its operated position but as the discharge current through winding 13 is preferably made smaller than the holding current through winding 15 on relay 1, the armature 10 will remain in its operated position for a definite period of time while the condenser 34 is discharging.

When the next impulse is transmitted over the line L the current through the winding 21 on relay 2 will again move the armature 20 to its operated position, thereby causing the armature 20 to again disconnect from contact 29 and make connection with contact 28 which again charges condensers 30 and 34 as is described above.

In this manner the electrical path from conductor C through the conductor $C_1$ is maintained operated and the electrical path from conductor C through the conductor $C_2$ is maintained disabled as long as impulses are transmitted over the line L in sufficiently short recurring intervals.

When the condenser 34 discharges before a succeeding impulse is received over the line L, the armature 10 on relay 1 will return to its normal position under control of the biasing means, thereby opening the path from conductor C to conductor $C_1$ and closing the path from conductor C to conductor $C_2$.

The invention is also capable of other modifications and adaptations not specifically referred to but included within the scope of the appended claims.

What is claimed is:

1. In an electrical communication system over which signal current impulses are transmitted, a main relay and an auxiliary relay, means for initially energizing said main and auxiliary relays by said current impulses, means including a condenser for further energizing said main and auxiliary relays, means including a three-element thermionic discharge device for still further energizing said main relay, means for releasing said auxiliary relay at the cessation of said signal current impulses, and a slow electrical circuit comprising capacitance connected between the grid and filament of said thermionic discharge device and high resistances connected to said capacitance, to prevent the release of said main relay for a predetermined time after said signal current impulses have ceased.

2. A delay action device comprising a main relay and an auxiliary relay, a winding on each of said relays, said windings connected in series to a source of electrical impulses, a condenser connected in series with other windings on each of said relays, a source of potential and a resistance connected in series across the series connection of said condenser and said other windings a three-element vacuum tube, the output of which is connected in series with a third winding on said main relay, another condenser and another resistance connected in parallel across the input of said vacuum tube, connections from said source of potential to said other condenser, a normally closed contact on said auxiliary relay, and connections from said normally closed contact to said condensers for discharging said condensers when said contact is closed.

3. A polar relay circuit including a main polar relay and an auxiliary polar relay, said main polar relay having an armature, a pair of contacts between which said armature is adapted to swing, an operating winding, an accelerating winding and a holding winding associated with said armature, said auxiliary polar relay having an armature, a pair of contacts between which said armature is adapted to swing, biasing means associated with said armature to maintain said armature normally in connection with one of said contacts, and operating winding and an accelerating winding associated with said armature, said accelerating windings on said main and said auxiliary relays bridged across the armature and the contact normally in connection with said armature on said auxiliary relay, means for energizing said accelerating windings to supplement the action of said operating windings on said main and auxiliary relays when said normally closed contact on said auxiliary relay is opened, a three-element vacuum tube arranged to transmit current through said holding winding on said main relay when said normally closed contact on said auxiliary relay is open and a slow electrical circuit connected to the input of said vacuum tube to prevent the cessation of current in the output circuit of said vacuum tube for a predetermined time after said auxiliary relay has released.

4. In a relay circuit for operating and holding a relay operated under control of impulses, a space discharge device in circuit with a winding on said relay, a condenser controlling by its potential the flow of current through said space discharge device and hence through said winding, means operated in response to said impulses for assisting in the initial operation of said relay and altering the charge in said condenser in a direction to increase current flow through said discharge device to cause operation of said relay, and circuit connections controlled by said means in response to said impulses for altering the condenser charge in the reverse direction too slowly to permit release of the relay during a succession of said impulses.

5. In a relay circuit for operating and holding a relay operated under control of impulses, a winding on said relay connected to the source of impulses, a space discharge device in circuit with another winding on said relay, a condenser controlling by its potential the flow of current through said space discharge device and hence through said other winding, means operated in response to said impulses for assisting in the initial operation of said relay and altering the charge in said condenser in a direction to increase current flow through said discharge device to cause operation of said relay, and circuit connections controlled by said means in response to said impulses for altering the condenser charge in the reverse direction too slowly to permit release of the relay during a succession of said impulses.

6. In a relay circuit for operating and holding a relay operated under control of impulses, a winding on said relay connected to the source of impulses, a space discharge device in circuit with another winding on said relay, a condenser controlling by its potential the flow of current through said space discharge device and hence through said other winding, means operated in response to said impulses for assisting in the initial operation of said relay and altering the charge in said condenser in a direction to increase current flow through said discharge device to cause operation of said relay, and circuit connections controlled by said means in response to said impulses for altering the condenser charge in the reverse direction too slowly to permit release of the relay during a succession of said impulses, said last mentioned means comprising a relay having two windings, one of said last mentioned windings being connected in series with said first mentioned winding on said first mentioned relay.

In witness whereof, I hereunto subscribe my name this 3rd day of June, 1929.

JOHN L. HOGG.